Feb. 27, 1968 H. F. RIETH 3,370,567

REMOTE CONTROL UNIT

Filed July 3, 1963 2 Sheets-Sheet 1

INVENTOR:
Harold F. Rieth
By Smyth, Roston & Pavitt
Attorneys

Feb. 27, 1968 H. F. RIETH 3,370,567

REMOTE CONTROL UNIT

Filed July 3, 1963 2 Sheets-Sheet 2

INVENTOR:
Harold F. Rieth
By Smyth, Roston & Pavitt
Attorneys

United States Patent Office 3,370,567

Patented Feb. 27, 1968

3,370,567

REMOTE CONTROL UNIT

Harold F. Rieth, Santa Monica, Calif., assignor to Packard-Bell Electronics Corporation, Los Angeles, Calif., a corporation of California Filed July 3, 1963, Ser. No. 292,645
14 Claims. (Cl. 116—137)

The present invention relates to remote control means and more particularly to means for remotely controlling a plurality of different functions.

Very frequently, it is desirable to be able to remotely control several different functions over a relatively short distance. For example, it is desirable to be able to control the various functions on a television receiver such as the station, volume, etc., from a viewing location that may be in a general range of about 10 to 50 feet away from the receiver. In order to be commercially attractive, such a remote control system must be relatively inexpensive, simple to use and very reliable in operation. In the more practical remote control systems which have been developed for this type of operation, an ultrasonic control signal is transmitted from the view area to the television receiver. In order to generate the ultrasonic signal, a small transmitter is provided which may be held in the viewer's hand. This transmitter when properly manipulated is effective to radiate a beam of ultrasonic energy toward the television receiver. A suitable control unit is provided on the television receiver to sense the ultrasonic signals and actuate suitable drive means for adjusting the function in the desired manner.

In one form of hand held transmitter, the ultrasonic signals have been generated by means of a battery driven oscillator which produces the desired ultrasonic signals. In another form of hand held transmitter, the signals are generated by percussively striking a tuning rod so as to cause it to vibrate at an ultrasonic resonant frequency. These transmitters have been very effective to generate the desired ultrasonic signals. However, heretofore, it has been necessary to transmit at least one separate ultrasonic signal for each of the functions which are to be adjusted. As a result, when there are a large number of functions to be controlled, the transmitter not only becomes very bulky and difficult to handle and use, but they also become very expensive. More particularly, when it is desired to control a colored television receiver, it is desirable to be able to control on the order of 8 or 10 functions. Although the former types of transmitters have been capable of transmitting the required number of ultrasonic signals, they have been extremely bulky and inconvenient to use. The control unit in the television receiver is effective to receive the ultrasonic signals of the various frequencies and actuate suitable drive means. The control unit must therefore have some form of device for sensing the ultrasonic signals and distinguishing the frequencies thereof. As a consequence, the control unit for the television receiver has been very expensive particularly when it is necessary to control a large number of functions.

It is now proposed to provide a remote control system which will overcome the foregoing difficulties. More particularly, it is proposed to provide a transmitter which is not only extremely simple and compact, but is also capable of radiating a large number of command signals which are easily identifiable and also to provide a control unit which is not only simpler and more reliable, but is also more inexpensive. This is to be accomplished by providing a new remote control system employing a new and novel transmitter and a new and novel control unit. The transmitter includes resonant means for radiating a beam of ultrasonic energy which includes a carrier wave of a predetermined fixed frequency and includes means for modulating the carrier wave with various control signals that correspond to the functions to be controlled. The control unit is effective to receive the carrier wave of the particular ultrasonic frequency and to demodulate or detect the carrier wave so as to provide the various control signals. Separate means are provided which are responsive to these control signals and are effective to adjust the desired functions.

These and other features and advantages of the present invention will become readily apparent from the following detailed description of a limited number of embodiments thereof, particularly when taken in connection with the accompanying drawings wherein like reference numerals refer to like parts, and wherein.

Figure 1:
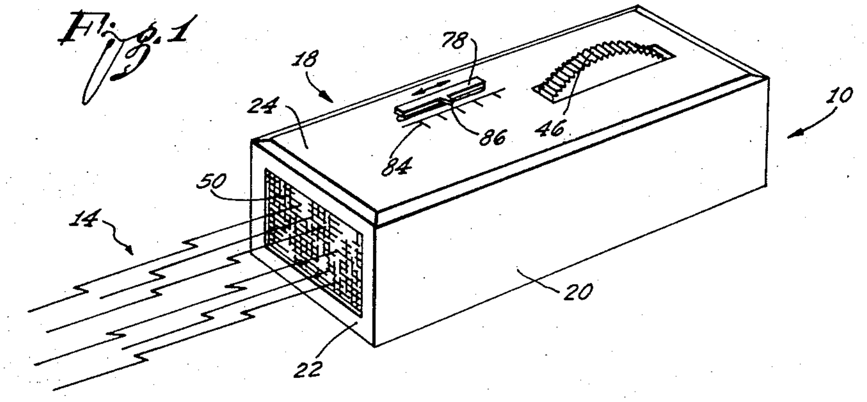
FIGURE 1 is a perspective view of a remote control transmitter embodying one form of the present invention.

Referring to the drawings in more detail, the present invention is particularly adapted to be embodied in a command transmitter 10 and a control unit 12. The transmitter 10 is effective to radiate a beam 14 of ultrasonic energy toward the control unit 12 whereby the control unit 12 will adjust one or more preselected functions in accordance with the manner in which the transmitter 10 is actuated. Although the functions that are to be controlled may be of any desired variety, in the present instance the transmitter 10 and the control unit 12 are particularly adapted to control the various functions in a television receiver 16 such as the volume, station or channel selector, contrast, color etc.

More particularly, the command transmitter 10 is enclosed in a housing 18 having a plurality of side walls 20, end walls 22 and a top or cover 24 as well as a bottom. The housing 18 may be fabricated in any desired manner such as molding out of a plastic material so that the end and side walls and the bottom may be a single integral structure. The top cover 24 may then be releasably secured to the side and end walls. When thus assembled, the housing 18 will enclose a chamber. This transmitter 10 is preferably of a size and shape that is easily held in a person's hand and manipulated while so held.

Figure 2:
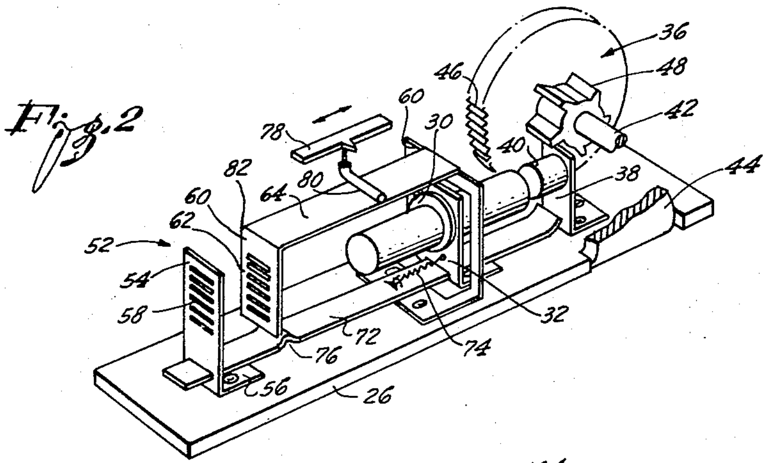
FIGURE 2 is a perspective view of the operative elements of the transmitter.

The operative elements of the transmitter 10 may be contained in the chamber enclosed by the housing 18 and may be similar to those shown in FIGURE 2. The various operative elements may all be mounted on a solid rigid base plate 26. The base plate 26 with the operative elements mounted thereon may be placed in the housing 18 and secured to the bottom of the housing 18. The operative elements include resonant means effective to generate and radiate a beam of ultrasonic energy. Although there are numerous resonant means suitable for accomplishing this, in the present instance these means include a tuning rod 28. This rod 28 is a substantially cylindrical member consisting of a highly resonant material such as aluminum or steel. The various characteristics of this tuning rod 28 such as its diameter, length, composition, etc., are all so proportioned that the rod will resonate in an axial mode at some predetermined ultrasonic frequency. Although this frequency may be of any desired amount, it has been found that a frequency in the general range of about 25 to 100 kilocycles is well suited for this purpose.

To support the tuning rod 28, a resilient grommet 30 may be bonded or otherwise secured to the tuning rod 28. This grommet 30 is preferably disposed adjacent a nodal point such as the center of the rod 28. This will permit the rod 28 to vibrate with a minimum amount of disturbance or attenuation. The grommet 30 may be supported by any suitable means. For example, an L-shaped mounting bracket 32 may be provided on the base plate 26. The grommet 30 is disposed in an opening in the center of an arm of the bracket normal to the base plate 26.

The tuning rod 28 may be excited into vibrating at its resonant frequency by any suitable means such as a striker assembly 34 that percussively strikes the tuning rod 28. In the present instance, this striker assembly 34 includes a hammer and a manually rotatable wheel 36. The present hammer includes an L-shaped mounting spring 38 that has its bottom leg secured to the base plate 26. The other arm of the spring 38 projects upwardly in substantial alignment with the axis of the tuning rod 28 so as to form a resonant cantilever spring.

A small metal cylinder 40 is secured to the end of the cantilever spring 38 so as to be carried by the spring 38 whenever it is deflected out of its position. The end of the metal cylinder 40 is preferably slightly spaced from the tuning rod 28 but in substantial alignment with the end. This distance between the metal cylinder 40 and the end of the tuning rod 28 is large enough to insure the rod 28 being free to vibrate. However, it is substantially less than the extent to which the spring 38 may be deflected.

The wheel 36 is preferably a single plastic member that is moulded around a solid steel shaft 42. The opposite ends of the shaft are adapted to fit into openings adjacent the upper ends of a pair of flanges 44 that are bent up from the opposite sides of the base plate 26. Alternatively, suitable bearings may be provided in the side walls of the housing 18. The periphery 46 of the wheel 36 may be serrated so as to provide a rough surface thereon that will be easy to push against with a finger or thumb. The wheel 36 is of a sufficient diameter to insure the serrated periphery 45 extending upwardly through an opening in the cover 24. It may thus be seen that a person holding the transmitter 10 in his hand can easily rotate the wheel 36 by applying his thumb or finger to the serrated periphery 46.

The wheel 36 may also include a ratchet or detent means. In the present instance, this means includes a cog wheel 48 molded integral with the control wheel 36. The cog wheel is disposed concentrically about the shaft 42 so as to include a series of teeth which project radially outwardly therefrom. Each of these teeth are adapted to engage the upper end of the spring 38.

When a person pushes against the periphery 46 of the wheel 36 to cause the wheel 36 to rotate, one of the teeth will engage the upper or free end of the cantilever spring 38 to deflect it away from the end of the tuning rod 28. If this rotation progresses through a sufficient arc, the end of the tooth will pass over the end of the spring 38 and release it. The free end of the spring 38 will then fly toward the tuning rod 28. The metal cylinder 40 will be carried by the spring 38 so as to percussively strike the end of the tuning rod 28. Therefore, the force of this impact will be of a sufficient magnitude to cause the tuning rod 28 to resonate in an axial mode at its natural resonant frequency.

When the rod 28 is vibrating, ultrasonic energy of the same frequency will be radiated from the end of the rod 28. In order to permit this energy to be radiated from the housing 18, the end wall 22 may have a window 50 therein which is transparent to the ultrasonic energy. In the present instance, this window 50 includes an opening in the end wall and a screen or mesh which extends across the opening so as to permit the beam 14 of ultrasonic energy to travel therethrough.

It may thus be seen that if the operator is holding the transmitter 10 in his hand, and turns the wheel 36, the cylinder 40 will strike the end of the tuning rod 28 and cause it to radiate a beam 14 of ultrasonic energy from the end of the rod 28 and through the window 50. This beam 14 of energy will have a constant frequency equal to the natural resonant frequency of the rod 28. The intensity of this beam will be proportional to the amplitude of the vibrations in the tuning rod 28 and, as a consequence, over an extended interval of time will exponentially decay.

In order to permit the transmitter 10 to be employed to control a plurality of functions, modulating means 52 may be provided in the transmitter 10 for modulating the ultrasonic energy in the beam 14. Although the modulating means 52 may be of any suitable variety, in the present instance the modulating means is effective to modulate the amplitude or intensity of the beam 14. This modulator 52 includes shutter means positioned in substantial alignment with the tuning rod 28 and disposed between the end of the rod 28 and the window 50.

The shutter means includes a first member 54 for being disposed in a predetermined fixed position. This member 54 is substantially L-shaped with a first leg 56 secured to the base plate 26. The main portion of the member 54 projects upwardly from the base plate 26 at substantially right angles thereto.

A single aperture or a set of apertures 58 are provided in the portion. The apertures 58 are of a sufficient size to permit the beam 14 of ultrasonic energy to pass therethrough with a minimum amount of attenuation. However, the portions of the member 54 which are free of any openings or apertures are effective to completely attenuate the ultrasonic energy and prevent its passing through the member 54.

A second shutter member 60 is disposed adjacent the first shutter member 54 in substantial alignment with the tuning rod 28. This shutter member 60 may be similar to the first one in that it also includes a single aperture or a set of apertures 62. The apertures 62 in the second set are arranged so that the ultrasonic energy will pass therethrough. The rest of the shutter member 60 will be effective to block the ultrasonic energy.

The apertures 58 and 62 in the two members 54 and 60 are preferably arranged and positioned substantially identical to each other. As a consequence, if the two shutter members 54 and 60 are positioned so that the apertures 58 and 62 in the two sets are aligned with each other, the ultrasonic energy will be free to travel through the apertures 58 and 60 in the two sets and escape through the window 50. However, if the second shutter member 60 is displaced vertically from the foregoing position, the apertures in one member will be misaligned from the apertures in the other member. That is, the apertures in one member will be aligned with the portions of the other member between the apertures. This will be effective to substantially completely block all of the ultrasonic energy and prevent its emergence from the window 50.

In order to support the second shutter member 60 for movement between the aligned and misaligned positions, the member 60 may be secured to the end of a spring 64. The present spring 64 is a flat strip that is supported by one end. The spring will thus form a cantilever leaf spring. The support end of the spring 64 may be formed integral with or secured to a suitable rigid support. Although this support may be formed by the mounting bracket 32, in the present instance it is formed by a separate L-shaped mounting bracket 66 secured to the base plate 26.

Figure 5:
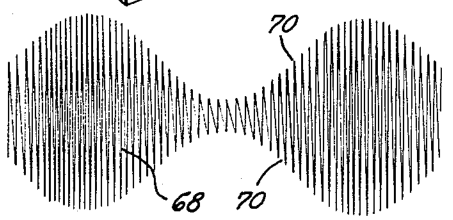
FIGURE 5 is a waveform of the ultrasonic signal radiated by the transmitter.
Figure 7:
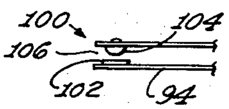
FIGURE 7 is a side view on an enlarged scale taken substantially along the plane of line 7—7 of FIGURE 6.
Figure 6:
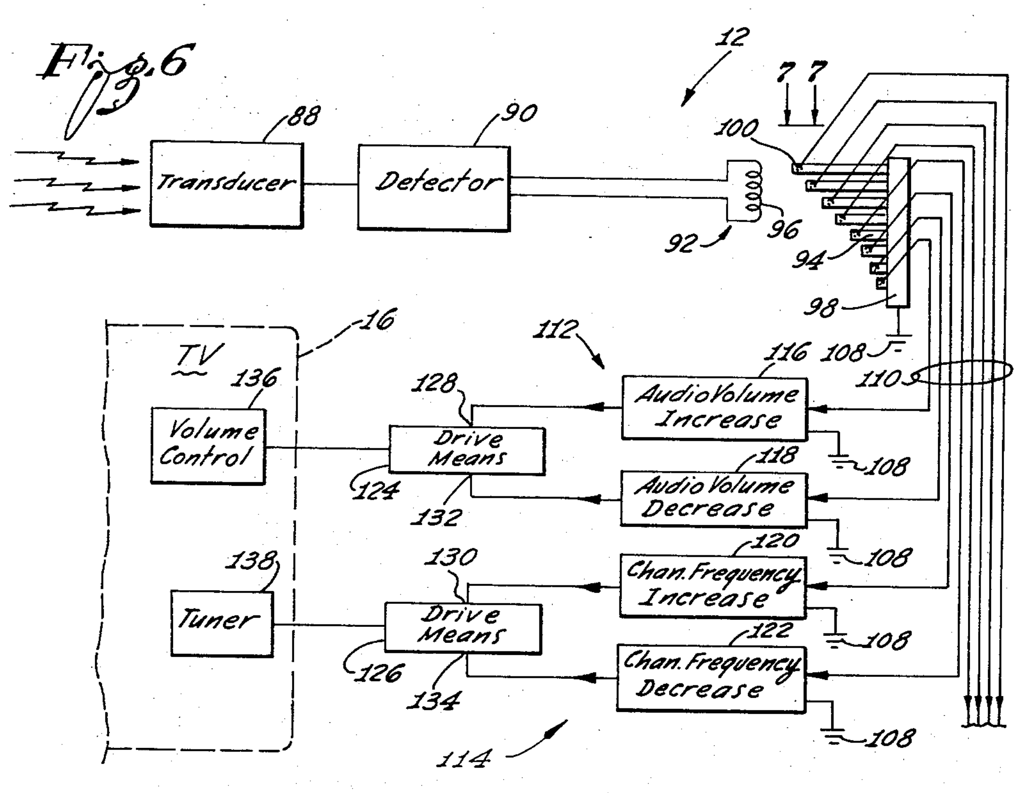
FIGURE 6 is a block diagram of a control unit embodying one form of the present invention.

It may thus be seen that the second shutter member 60 may resiliently oscillate relative to the first shutter member 54 between various positions wherein the apertures 58 and 62 are aligned and wherein they are misaligned. This will be effective to modulate the intensity of the ultrasonic beam as it passes through the shutter means. As seen in FIGURE 5, the beam will include an ultrasonic carrier 68 having an envelope defined by a lower frequency or control signal 70. The frequency at which the beam 14 is modulated or the frequency of the control signal will be at substantially the same frequency as the resonant frequency of the spring 64. Although this frequency may be of any desired amount, it has been found that a frequency in the general range of 50 cycles per second up to several kilocycles is satisfactory.

When the tooth of the cog wheel 48 passes over the end of the spring 38, the releasing of the spring 38 and the impacting of the hammer or metal cylinder 40 on the tuning rod 28 will produce a substantial amount of vibration in the entire transmitter 10. Although this may be effective to cause the shutter member 60 and spring 64 to vibrate, it has been found that the amount of vibration is somewhat unpredictable and of limited amplitude. Accordingly, it may be desirable in some transmitters to provide means for exciting the spring 64 into substantial vibrations.

In the present instance, the means includes a slide member 72 that extends longitudinally of the housing 18. This slide member 72 may be mounted on the base plate 26 or in a pair of aligned openings in the members 32 and 54. One end of this slide member 72 is positioned to engage the spring 38 so as to be moved thereby. Preferably, a spring 74 is provided for biasing the slide member 72 so as to maintain the end thereof against the spring 38.

The slide member 72 also includes a projection 76 that is positioned to engage the end of the shutter member 60. The spring 74 will maintain the slide member 72 so positioned that the shutter member 60 will be free to vibrate. However, when the member 72 is moved away from the striker assembly by the released spring 38, the projection 76 will momentarily raise the shutter member 60 and then release it. As a consequence, whenever the operator rotates the wheel 36 to strike the tuning rod 28 and cause it to vibrate, he will also strike the shutter member 60 and cause the spring 64 to vibrate. It may thus be seen that every time the wheel 36 is rotated, the transmitter 10 will radiate a beam 14 of ultrasonic energy consisting of an ultrasonic carrier 68 of a predetermined frequency modulated by a lower frequency or control signal 70. The frequency of this control signal 70 will be the same as the frequency of the spring 64.

In the event that it is desirable to employ the transmitter 10 for controlling more than one function, means may be provided for controlling the frequency at which the ultrasonic beam 14 is modulated. Although there are numerous ways of accomplishing this, in this embodiment the resonant frequency of the spring 64 is varied. More particularly, a manually actuatable slide member 78 is provided. A member 80 is secured to the underside of the slide 78 so as to extend into the space inside of the housing. This member 80 is positioned so that it will bear against the spring 64. This will form a nodal point on the spring 64 so that the effective length of the spring 64 and therefore its resonant frequency will be determined by the distance between the end 82 of the spring 64 and the point at which the member 80 engages the spring 64. Thus, by moving the slide 78 axially of the housing 18, the point of contact of the member 80 on the spring 64 will move. This will effectively change the length of the spring 64 and vary the resonant frequency of the spring 64. This, in turn, will vary the frequency at which the second shutter member 60 oscillates and the frequency at which the energy is modulated.

A series of indicia 84 and a co-acting pointer 86 may be provided so as to indicate the frequency at which the beam 14 is modulated or to indicate the function that will be adjusted by the beam 14 modulated at that frequency. Thus, by adjusting the slide 78 until the pointer 86 registers with the desired indicia 84 and rotating the wheel 36 to strike the tuning rod 28, a beam 14 of ultrasonic energy will be radiated from the transmitter 10 and the beam 14 will be modulated at a frequency that corresponds to the function to be adjusted.

If a person desired to adjust a function such as the setting of one of the controls on a television set 16, he may use the transmitter 10 to accomplish the control from a remote location. To do so, the indicator slide 78 is first positioned so that the pointer 86 will register with the indicia 84 that corresponds to the particular function which it is desired to adjust. For example, if it is desired to increase or decrease the volume or to increase or decrease the station frequency or any other function, the indicator slide 78 will be positioned so that the pointer 86 will be aligned with the indicia 84 so marked. The operator may then aim the end 22 of the transmitter 10 in the general direction of the television receiver 16 and then rotate the wheel 36 by pushing his thumb or finger against the periphery 46.

As the wheel 36 rotates, one of the teeth on the cog wheel 48 will engage the end of the spring 38 and deflect it away from the tuning rod 28. When the wheel 36 has rotated far enough, the spring 38 will pass over the end of the tooth and fly toward the tuning rod 28. This will cause the metal cylinder 40 to hit the end of the tuning rod 28 and excite the tuning rod 28 into vibrating in an axial mold. A beam of sonic energy will then be radiated from the end of the tuning rod 28 toward the shutter means and the window 50. At the same time the spring 38 is flying forward, it will engage the end of the slide member 72 and force it to move toward the window 50. As this motion occurs, the projection 76 on the member 72 will engage the end of the shutter member 60. The member 60 and the spring 64 will then be deflected upwardly and away from the base plate 26. The spring 74 will then return the slide member 72 to its normal position wherein the projection 76 is clear of the end of the shutter member 60. The spring 64 will thus vibrate simultaneously with the tuning rod 28. The shutter member 60 will move up and down at the same frequency as the resonant frequency of the spring 64 and modulate the ultrasonic energy as the apertures 58 and 62 become aligned and misaligned. The resonant frequency of the spring 64 will be determined by the point at which the member 80 engages the spring 64.

As a consequence, the shutter member 60 will be vibrating at a frequency that corresponds to the particular function that is to be adjusted. This, in turn, will result in the beam 14 of ultrasonic energy being modulated by a control signal 70 corresponding to the function to be adjusted. This beam of energy will thus form a command signal which includes an ultrasonic carrier 68 having a frequency in the general region of 25 to 100 kilocycles and a control signal which is modulated onto the carrier. The frequency of the control signal may be an audio frequency range on the general order of about 100 to about 3,000 cycles per second. This beam 14 of modulated ultrasonic energy will be radiated toward the control unit 12 so as to be received thereby.

The control unit 12 is mounted on the television receiver 16 or whatever structure is to be controlled thereby. The present control unit 12 includes a transducer 88 that is positioned so as to be exposed to the energy in the beam 14. The transducer 88, in turn, will be effective to convert the mechanical vibrations of the beam 14 into an electrical signal. The electrical signal from the transducer 88 will be substantially identical to the command signal formed by the ultrasonic beam 14. More particularly, the electrical signal will include a carrier signal having a frequency in the 25 to 100 kilocycle range. This carrier signal, in turn, will be amplitude modulated by a control signal having the same frequency as the control signal modulated onto the ultrasonic beam 14, i.e., in the audio range.

The output of the transducer 88 is interconnected with a suitable demodulator and/or detector 90. This demodulator and/or detector 90 is effective to demodulate the carrier signal so as to remove the control signal. As a consequence, the output from the detector will be an electrical signal having the same frequency as the control signal 70 modulated onto the carrier wave 68.

The output of the detector 90 may be interconnected with any suitable filter means 92 for sensing the various control signals 70 of differing frequencies. The filter means 92 is responsive to the various frequencies of the various control signals 92 and will provide separate electrical signals for each of the control signals.

Although any suitable filter means may be employed, in the present instance the filter means 92 includes a series of resonant reeds 94 and electromagnetic means 96 for exciting the reeds 94. The electromagnetic means 96 consists of a solenoid having the opposite ends thereof electrically interconnected with the output of the detector 90. As a consequence, electrical currents corresponding to the control signals 70 modulated onto the beam 14 will circulate through the solenoid. This, in turn, will produce a magnetic flux field around the solenoid which will have the same frequency as the control signals 70.

The resonant reeds 94 may comprise a series of leaf springs that are cantilevered out from a base or support 96. All of the reeds 94 are disposed adjacent to the solenoid so as to be within the flux field generated thereby. Each of these reeds 94 may be tuned to a frequency that corresponds to the frequency of one of the control signals 70. This tuning may be accomplished by any suitable maens such as by varying the lengths of the reeds 94 whereby their resonant frequencies will vary in a corresponding manner. It will thus be seen that whenever an ultrasonic signal is received by the transducer 88, a current will flow through the solenoid 92 so as to generate a magnetic flux field. This flux field will have a frequency which will correspond to the frequency of any control signals 70 which are modulated onto the ultrasonic beam 14. As a result, each of the reeds 94 will be excited at the same frequency as the control signal 70. All of the reeds 94 except one will have resonant frequencies which differ substantially from this frequency. As a consequence, these reeds 94 will experience very little if any mechanical vibration as a result of the oscillating flux field. However, one and only one of the reeds 94 will have a natural resonant frequency which is substantially identical to the frequency of the control signal. The oscillating flux field will thus excite this reed 94 at its own natural resonant frequency. As a consequence, only the reed 94 tuned to the same frequency as the control signal 70 will mechanically vibrate at a very large amplitude.

In order to sense the amplitudes of the vibrations of the reeds 94, suitable switch means 100 may be provided on each of the reeds 94. In the present instance, these switch means 100 include a first contact 102 which is mounted on the reed 94 adjacent its end so as to move with the reed. Also, a stationary or fixed contact 104 is disposed adjacent the reed 94 in substantial alignment with the movable contact 102.

The two contacts 102 and 104 are preferably separated from each other by a space 106 which is slightly greater than the space through which the reed 94 will vibrate when it is not being excited at its resonant frequency. However, the space 106 between the contacts 102 and 104 is substantially less than the amount of displacement of the reed 94 when it is being excited at its resonant frequency. It may thus be seen that if the solenoid 96 is being energized with a current having a frequency equal to the resonant frequency of one of the reeds 94, that reed 94 will be excited so as to vibrate through a sufficient distance to close the contacts 102 and 104 or at least cause them to intermittently engage each other. All of the remaining reeds will vibrate through amplitudes which are inadequate to cause their respective contacts 102 and 104 to engage each other.

All of the movable contacts 104 on the reeds 94 are electrically interconnected with each other and to an electrical ground 108. Each of the fixed contacts 102 is electrically isolated from all of the other fixed contacts. However, each fixed contact 102 is connected to a conductor in a cable 110. Each of these conductors leads to one branch of a means for controlling a function such as the volume of the sound, the station being received, the contrast, the color, etc., in a television receiver 16.

Although the conductors 110 may lead to any desired number of control means in the present instance only the control means 112 for regulating the sound and control means 114 for regulating the station received are shown. Each of the means 112 and 114 includes two branches 116, 118, 120 and 122 that are connected to a suitable drive means 124 and 126. Each of the branches 116, 118, 120 and 122 includes a suitable holding means. Thus, when the switch 100 for a branch closes, the holding means within the branch will maintain the branch energized. It should be noted that normally the tuning rod 28 will vibrate for a very short time and the movable contacts 104 will engage the fixed contacts 102 only when the reed is at its maximum deflection. As a consequence, the current from the switch means 100 will normally be intermittent and of a duration that is shorter than the interval required for adjustment to be completed. However, once the movable contact 102 hits the fixed contact 104, the holding means will be effective to retain the branch energized until the adjustment is completed.

Each of the branches 116, 118, 120 and 122 in addition to the holding means, includes means that are effective to feed an electrical signal to a driving means as long as the branch is energized. The drive means 124 and 126 may be of any suitable variety. By way of example, they may be a so-called stepping relay or an electric motor. Normally, each of the drive means 124 and 126 will include a forward input 128 or 130 and a reverse input 132 and 134. Each of these inputs is adapted to receive a signal and cause the respective drive means 124 or 126 to operate in its respective direction. Thus, if the branch 116 feeds a signal to the forward input 128 of the drive means 124, it will run in the forward direction, but if the branch 116 feeds a signal to the reverse input 132, the drive means 124 will run in the reverse direction. Similarly, if the branch 120 feeds a signal to input 130, the drive means 126 will run in the forward direction but if branch 122 feeds a signal to input 134, the drive means 126 will run in the reverse direction.

Each of the drive means is interconnected with a control that regulates the function that is to be adjusted. For example, drive means 124 may be connected to a volume control 136 in the receiver 16 while the driver means 126 is connected to a tuner 138. If additional controls are provided, the respective branches and drive means may be connected to respective controls. As a result, the drive means will commence actuating the associated control so as to accomplish the desired adjustment. The holding means will be effective to maintain the drive means energized long enough for the desired adjustment to be completed.

It will thus be seen that if the transmitter 10 is actuated so as to radiate a beam 14 of energy toward the television receiver 16, a beam 14 including an ultrasonic carrier 68 modulated by a lower frequency control signal 70 will be incident on the transducer 88. The transducer 88 will receive the ultrasonic beam 14 and produce an electrical signal substantially the same as the beam 14. More particularly, the signal includes a carrier having the same ultrasonic frequency and modulated by the lower frequency control signal. The transducer 88 will be effective to feed the electrical signal to the detector 90. The detector 90 will in turn demodulate the electrical signal and provide an electrical control signal. This control signal will have the same frequency as the control signal modulated onto the ultrasonic carrier by the vibrating shutter member 60. Thus the frequency of the electrical control signal will be determined by the setting of the indicator 78 and will correspond to the function to be adjusted. The signal from the detector 90 will then circulate through the solenoid 96 and cause the various reeds 94 to be energized at the same frequency. The reed 94 having a natural resonant frequency corresponding to the frequency of the current will vibrate in a resonant mode and be deflected by a sufficient amplitude to cause the two contacts 102 and 104 to at least momentarily close. All of the remaining reeds 94 will not vibrate through a sufficient distance to close the contacts 102 and 104. When the contacts close, the respective branches 116 to 122, respectively, will momentarily be energized. This will be for a sufficient period of time to energize the holding means. The holding means will then retain the branches 116 to 122, respectively, energized until the drive means 136 or 138 has varied the respective control by an adequate amount to complete the desired adjustment. When the adjustment is completed, the holding means will permit the branch to be de-energized so the system will be ready for a further adjustment.

Figure 3:
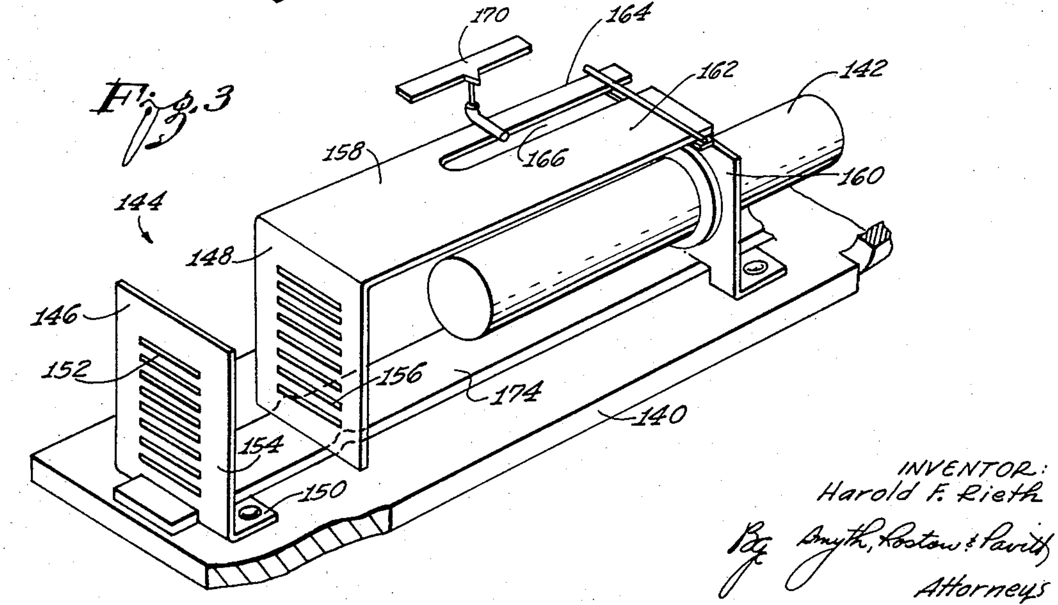
FIGURE 3 is a perspective view similar to FIGURE 2 but showing a modification thereof.

The foregoing embodiment is effective to modulate the carrier wave 68 at the various control frequencies. However, it has been found that a relatively small amount of movement of the indicator 78 produces large changes in the resonant frequency of the shutter member 60 and spring 64. Under some circumstances, and particularly where a very large number of closely spaced control frequencies are desired, it may be difficult to provide an adequate amount of travel for the indicator 78. In order to overcome this difficulty and to expand the scale or spacing between the various indicia 84 on the indicator 78, the embodiment of FIGURE 3 may be employed.

This embodiment is substantially identical to the embodiment of FIGURES 1 and 2 in that it is also mounted on a base plate 140 that is adapted to be mounted in a housing. The housing is preferably particularly adapted for being held in a person's hand while used for remotely controlling a device such as a television receiver. The base plate 140 may include means such as a tuning rod 142 which is effective to radiate a beam of ultrasonic energy. A striker assembly may be provided that is substantially identical to the striker assembly 34 in the first embodiment. The striker assembly 34 may include a hammer or cylinder that is mounted on the end of a leaf spring for being actuated by a wheel that extends above the top of the housing. An operator holding the housing in his hand may thus manually manipulate the wheel with a finger or thumb.

In order to modulate the energy in the beam, shutter means 144 similar to the shutter means in the first embodiment is provided in substantial alignment with the end of the tuning rod 142. This shutter means 144 includes a first shutter member 146 and a second shutter member 148. The first shutter member 144 may be substantially identical to the shutter member 54 in the first embodiment and is an L-shaped member having one leg 150 secured to the base plate 140. The other leg 154 projects upwardly in front of the tuning rod 142 and includes a series of parallel slots or apertures 152.

The second shutter member 148 includes a portion having a set of apertures 156 that are substantially identical to the apertures 152 in the first set. The second shutter member 148 is mounted on or is formed from the end of a resilient leaf spring 158 in much the same manner as in the first embodiment. The spring 158 is secured to the upper end of the support 160 for the tuning rod 142.

In this embodiment, instead of being a solid member, the spring 158 includes a primary portion 162 and a secondary portion 164. The two portions 162 and 164 are separated from each other by a slot 166 which extends longitudinally of the spring 158 for a major portion of its length. The slot 166 is positioned so that the primary portion 162 will have a width that is on the order of about 2 to 4 times the width of the secondary portion 164.

A slide indicator 170 substantially identical to that in the first embodiment is provided on the cover of the housing so as to indicate the particular function which is to be adjusted. The slide 170 also includes a member 172 which extends downwardly against the surface of the narrow portion 164 of the spring 158. This member 172 will hold the point of contact on the spring stationary. This, in turn, will be effective to control the effective length of the secondary portion of the spring 164. The overall resonant frequency of the spring will be determined by a resultant of the effective lengths of the primary and secondary portions 162 and 164 of the spring 158. Thus, by moving the slide indicator 170 along the secondary portion 164, the resonant frequency of the leaf spring 158 will change. However, since the secondary portion 164 is relatively narrow compared to the primary portion 162, it will take a much greater movement of the member 172 to produce a given amount of change in the resonant frequency of the entire leaf spring 158.

In order to excite the leaf spring 158 into vibration, a slide detent 174 may be provided. The detent 174 is slidably mounted on the support 160 and the leg 154 and includes a projection 176 positioned to strike the shutter member 148. The opposite end of the slide 174 is positioned to engage the spring means in the striker assembly. Thus, whenever the tuning rod 142 is excited into vibration, the projection 176 will move the shutter member 148 and cause the spring 158 to vibrate. When the spring 158 is vibrating, the shutter member 148 will oscillate so that the apertures 152 and 156 in the two sets will be alternately aligned and misaligned so as to modulate the beam.

It will thus be seen that by a proper proportioning of the widths of the two portions 162 and 164, the amount of movement of the member 172 required to produce a given range of frequency variation may be increased to any desired amount. Thus, the indicator 170 can be made movable over an extended scale whereby a large number of functions can be conveniently indicated on a single scale.

Figure 4:
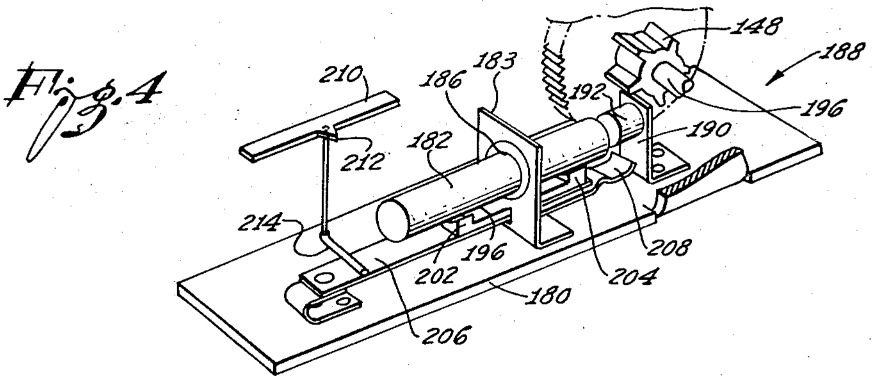
FIGURE 4 is a perspective view similar to FIGURE 2 but showing a further modification thereof.

As a further alternative, the embodiment of FIGURE 4 may be employed. This embodiment is similar to the foregoing embodiments in that a base plate 180 is provided which is adapted to be mounted in a housing. The housing may be substantially identical to the foregoing housing in that it is of a size and shape for being hand held. Resonant means such as a tuning rod 182 may be provided for radiating the ultrasonic energy. The tuning rod 182 may be mounted on a bracket 184 that projects upwardly from the base plate 180. A rubber grommet 186 may be bonded to the tuning rod 182 adjacent a nodal and secured to the bracket 184 so as to retain it in a fixed position without materially affecting the resonant vibrations of the tuning rod 182.

A striker assembly 188 may be provided for striking the end of the rod 182 and causing it to vibrate. The present assembly includes a cantilever leaf spring 190 and a metallic cylinder 192 thereon for striking the end of the rod 182. A wheel 194 is rotatably mounted on a metal shaft 196. A cog wheel 198 on the side of the wheel 194 is provided to engage the spring 190 and snap the cylinder 192 against the tuning rod 182 whenever the wheel 194 is rotated.

In order to modulate the frequency of the energy in the beam, magnetic means may be coupled to the tuning rod 182. In the present instance, this magnetic means includes a permanent magnet 200 that has a pair of pole faces 202 and 204 joined by a center section. The magnet 200 is secured to the end of a leaf spring 206 so as to be carried by the spring 206. The spring 206 is secured to the base plate 180 so as to position the magnet 196 adjacent the tuning rod 182. It has been found desirable for the pole faces 202 and 204 to be disposed on the opposite sides of the grommet 186. This will cause the flux field to extend axially of the tuning rod 182 in the region of the nodal point.

A slide member 208 or similar means may be provided that engages the end of the spring 206 and the spring 190. As a result, whenever the striker assembly 188 is actuated, the tuning rod 182 will be struck so as to oscillate and the spring 206 will be actuated into oscillating. When the spring 206 oscillates, the magnet 202 will move toward and away from the tuning rod 182. As a result, the flux density inside of the rod 188 will vary in a harmonic manner. As the flux density varies, the length of the rod 188 will tend to vary. This will result in the frequency of the energy radiated from the rod 188 being modulated.

In order to permit controlling a large number of functions, a slide indicator 210 may be provided on the housing. This indicator 210 may include a pointer 212 that indicates the particular function that is to be adjusted and a member 214 that bears against the spring 206. This member 214 will be effective to tune the spring 206 so as to modulate the energy radiated from the tuning rod 182 with a control signal having a frequency that corresponds to the function to be controlled.

While only a limited number of embodiments have been disclosed and described herein, it will be readily apparent to persons skilled in the art that numerous changes and modifications may be made thereto without departing from the spirit of the invention. For example, the means for generating the ultrasonic energy and the means for modulating the energy may be of any desired variety. Accordingly, the foregoing drawing and description thereof are for illustrative purposes only and do not in any way limit the invention which is defined only by the claims which follow.

What is claimed is:

1. In combination,
a housing having a window in one end that is transparent to said signals,
resonant means disposed in said housing for vibrating at a particular frequency to radiate through said window a beam of ultrasonic energy having said particular frequency,
manually actuatable means mounted on said housing in cooperative relationship with said resonant means to excite said resonant means into vibrating at said particular frequency and radiating said energy,
modulation means disposed inside of said housing in cooperative relationship with said resonant means for modulating the radiated energy at a controlled frequency different from the particular frequency, and
means on said housing and coupled to said modulation means for producing variations in the controlled frequency at which said ultrasonic signal is modulated.

2. A transmitter for radiating a command signal defined by an ultrasonic carrier signal at a first particular frequency and at least one signal modulated on said carrier frequency at a second particular frequency different from the first particular frequency, including,
a housing having a window in one end that is transparent to said command signal,
a tuning rod disposed in said housing adjacent said window, said rod having properties of vibrating at a natural resonant frequency corresponding to the first particular frequency to radiate a beam of said ultrasonic energy through said window when excited into vibrations,
a striker assembly disposed inside of said housing adjacent said tuning rod for percussively striking said tuning rod and causing said rod to vibrate at its natural resonant frequency,
means disposed on said housing for manually actuating said striker assembly to cause said assembly to strike said tuning rod, and
modulation mean disposed adjacent said tuning rod in cooperative relationship with said striker assembly and actuated by said striker assembly for modulating said carrier frequency energy at the second particular frequency.

3. A transmitter for radiating a command signal defined by an ultrasonic carrier signal at a first particular frequency and at least one signal modulated on said carrier frequency at a second particular frequency, said transmitter including the combination of:
a housing having a window in one end that is transparent to said command signal,
a tuning rod disposed in said housing adjacent said window, said tuning rod having properties of vibrating at a natural resonant frequency equal to the first particular frequency to radiate a beam of ultrasonic energy through said window when excited into vibrations,
a striker assembly disposed inside of said housing and adjacent said tuning rod for percussively striking said tuning rod and causing said rod to vibrate at its natural resonant frequency,
manually actuatable means disposed on said housing for manually actuating said striker assembly to cause said assembly to strike said tuning rod,
modulation means disposed in said housing adjacent said tuning rod and operatively interconnected with said tuning rod for modulating said carrier frequency energy at the second particular frequency, and
control means disposed on said housing and operatively interconnected with said modulation means for providing controlled variations in the frequency at which said modulation means modulates the ultrasonic carrier signal.

4. A transmitter for radiating a command signal defined by an ultrasonic carrier signal at a first particular frequency and at least one modulation signal modulating the ultrasonic carrier signal at a second particular frequency, said transmitter including the combination of:
first means for producing and radiating the ultrasonic carrier signal in a beam,
a resilient spring disposed in cooperative relationship with the first means and movable between a constrained and an unconstrained position for initiating the production of the ultrasonic carrier signal upon becoming constrained and subsequently released from such constraint,
means disposed in cooperative relationship with the spring for initially constraining the resilient spring and subsequently releasing the spring from such constraint, and
means mounted on said spring and disposed in said beam of the ultrasonic carrier signal and disposed in cooperative relationship with the spring for modulating said beam at the second particular frequency upon the constraint and subsequent release of the spring.

5. A transmitter for radiating a command signal defined by an ultrasonic carrier signal at a first particular frequency and at least one modulation signal modulating the ultrasonic carrier signal at a second particular frequency, said transmitter including the combination of:
resonant means having a natural resonant frequency at the first particular frequency, said means when excited being effective to radiate the ultrasonic carrier signal in a beam,
a pair of shutter members disposed in substantial alignment with said resonant means and positioned in the path of said ultrasonic carrier signal,
a first one of said shutter members being disposed in a fixed position and having a first set of apertures through which said ultrasonic energy may pass, the other of said shutter members including a second set of apertures that correspond to said first set of apertures and, when excited, being movable relative to the first shutter member between positions of alignment and misalignment of the apertures in the first and second sets to modulate the ultrasonic carrier signal at the second particular frequency, and means disposed in cooperative relationship with the resonant means and the other shutter member for simultaneously exciting the resonant means and the other shutter member.

6. The transmitter set forth in claim 5 wherein means are operatively coupled to the other one of the shutter members for providing controlled variations in the rate of movement of the other shutter member relative to the first one of the shutter members to vary the second particular frequency.

7. A transmitter for radiating a command signal defined by an ultrasonic carrier signal at a first particular frequency and at least one modulation signal modulating the carrier signal at a second particular frequency, said transmitter including the combination of:

resonant means having a natural resonant frequency at the first particular frequency, said resonant means when excited being effective to produce and radiate the ultrasonic carrier signal in a beam, actuatable means disposed in cooperative relationship with the resonant means for exciting said resonant means at the natural resonant frequency upon the actuation of the actuatable means, a pair of shutter members disposed in substantial alignment with said resonant means and positioned in the path of said ultrasonic carrier signals and in spaced relationship in the direction of the beam of the ultrasonic carrier signals, one of said shutter members being disposed in a fixed position and having a first set of apertures through which said ultrasonic carrier signals may pass, the other of said shutter members including as second set of apertures that correspond to said first set of apertures, the other shutter member being movable in a particular direction to affect the alignment of the apertures in the second set relative to the apertures in the first set, spring means disposed in cooperative relationship with the other shutter member and with the actuatable means and resonant at the second particular frequency for resiliently carrying said second shutter member in the particular direction at the second particular frequency upon the actuation of the actuatable means, and control means operatively connected to said spring means for providing controlled variations in the resonant frequency of said spring means to provide variations in the second particular frequency.

8. A transmitter for radiating a command signal defined by an ultrasonic carrier signal at a first particular frequency and at least one modulation signal modulating the carrier signal at a second particular frequency, said transmitter including the combination of:

a housing having a window in one end that is transparent to said command signal, a tuning rod disposed in said housing and having a natural resonant frequency at the first particular frequency, said means when excited being effective to radiate the ultrasonic carrier signal in a beam through said window, a striker assembly disposed in said housing in contiguous relationship to said tuning rod to strike said tuning rod and cause said rod to vibrate at its natural resonant frequency and radiate said ultrasonic carrier signal through said window, a first shutter member disposed on said housing in substantial alignment with said tuning rod and in the path of said beam, said member including a first set of apertures through which said carrier signal may pass, a second shutter member movably mounted in said housing adjacent said first shutter member and in substantial alignment with said tuning rod and in the path of said beam of said ultrasonic carrier signal, said second member including a second set of apertures through which said carrier signal may pass, said second member being movable at the second particular frequency between first positions wherein the apertures in said first and second sets become aligned to provide for a passage of said carrier signal through such apertures and second positions wherein the apertures become misaligned to inhibit the passage of the carrier signal through such apertures, and, means disposed in cooperative relationship with the striker assembly for obtaining a movement of the second shutter assembly at the second particular frequency at the time that the tuning rod becomes excited.

9. A transmitter for transmitting a command signal defined by an ultrasonic carrier signal at a first particular frequency and at least one modulation signal modulating the carrier signal at a second particular frequency, said transmitter including the combination of:

resonant means having a natural resonant frequency at the first particular frequency, said means when excited being effective to produce said ultrasonic carrier signal at the first particular frequency and radiate said signal in a beam, the resonant means having properties of responding to variations in a magnetic field to provide modulations in the carrier signal, means disposed in cooperative relationship with the resonant means for obtaining a resonance of the resonant means at the natural frequency of the resonant means, and magnetic means disposed adjacent said resonant means and coupled to said resonant means to provide variations in the magnetic field at the second particular frequency.

10. A transmitter for transmitting a command signal defined by an ultrasonic carrier signal at a first particular frequency and at least one modulation signal modulating the carrier signal at a second particular frequency, said transmitter including the combination of:

resonant means having a natural resonant frequency at the first particular frequency, said means when excited being effective to produce the carrier signal at the first particular frequency and to radiate said carrier signal in a beam, the resonant means having properties of responding to variations in a magnetic field to provide modulations in the carrier signal, actuatable means disposed in cooperative relationship with the resonant means for exciting said resonant means, magnetic means disposed adjacent said resonant means and in cooperative relationship with the resonant means, means disposed in cooperative relationship with said actuatable means to oscillate said magnetic means toward and away from said resonant means, upon the excitement of the resonant means, to modulate said carrier signal at the second frequency, and means operatively interconnected with said last means for providing controlled variations in the frequency at which said magnetic means oscillates toward and away from said resonant means to vary the second particular frequency.

11. A transmitter for transmitting a command signal defined by an ultrasonic carrier signal at a first particular frequency and at least one modulation signal modulating the carrier signal at a second particular frequency, said transmitter including the combination of:

resonant means having a natural resonant frequency substantially equal to the first particular frequency to produce the ultrasonic carrier signal when resonated, said resonant means when excited being effective to radiate said ultrasonic carrier signal in a beam, a spring disposed adjacent to said resonant means for producing a resonance in said resonant means upon becoming constrained and subsequently released, means disposed in cooperative relationship with said spring for constraining and subsequently releasing said spring, magnetic means secured to said spring adjacent said resonant means for oscillating toward and away from said resonant means at the second particular frequencies, said magnetic means being effective to modulate said carrier signal at the second particular frequency, and means operatively interconnected with said spring for providing controlled variations in the frequency at which said magnetic means oscillates.

12. A transmitter for transmitting a command signal defined by an ultrasonic carrier signal at a first frequency and at least one modulation signal modulating the carrier signal at a second particular frequency, said transmitter including the combination of:

a housing having a window in one end that is transparent to said command signal, a tuning rod having a particular length and disposed in said housing adjacent said window for vibrating at the first frequency to produce the ultrasonic carrier frequency and for radiating the ultrasonic carrier signal through said window in a beam, the tuning rod having properties of having the particular length varied by a magnetic field, actuatable means on said housing to strike said tuning rod upon actuation and cause said rod to vibrate at said first particular frequency, a magnet disposed in cooperative relationship with said actuatable means for actuation by the actuatable means, and support means on said housing for supporting said magnet adjacent said tuning rod for vibratory movement toward and away from said tuning rod at the second frequency upon actuation of the magnet by the actuatable means to affect the particular length of the tuning rod and modulate the ultrasonic carrier signal by the second frequency.

13. A transmitter for transmitting a command signal defined by an ultrasonic carrier signal at a first particular frequency and at least one modulation signal modulating the ultrasonic carrier signal at a second particular frequency, said transmitter including the combination of:

a housing having a window in one end that is transparent to said command signal, a tuning rod of magnetic material in said housing with one end thereof positioned adjacent said window, said rod being constructed to vibrate at the first particular frequency to produce the ultrasonic carrier signal and to radiate said signal through said window in a beam, a striker assembly mounted on said housing to percussively strike said tuning rod and vibrate said rod at said first particular frequency, actuatable means on said housing operatively interconnected with said striker assembly to actuate said striker assembly to strike said tuning rod, a spring on said housing adjacent said tuning rod and coupled to said actuatable means to become constrained and released by said actuatable means, a magnet mounted on said spring adjacent to said tuning rod for creating a magnetic flux field through said tuning rod, said spring being effective to oscillate said magnet toward and away from said tuning rod at the second particular frequency, and means on said housing and coupled to said spring to provide controlled variations in the second particular frequency at which said spring oscillates and said magnet moves toward and away from said rod, said tuning rod having properties of being responsive to the movement of the magnet toward and away from the rod to provide modulations in the ultrasonic carrier signal at the second particular frequency in accordance with such movement.

14. The transmitter set forth in claim 4 wherein the modulating means includes a shutter disposed in cooperative relationship with the spring for resilient movement through said beam upon the constraint and subsequent release of the spring to modulate said beam at the second particular frequency.

References Cited

UNITED STATES PATENTS

| | | | |
|---|---|---|---|
| 1,049,433 | 1/1913 | Winslow | 181—64.1 |
| 1,371,900 | 3/1921 | Johnson | 181—27 |
| 1,941,324 | 12/1933 | Schirmer | 116—147 |
| 2,645,301 | 7/1953 | De Vries | 181—33 |
| 2,821,955 | 2/1958 | Ehlers et al. | 116—137 |
| 2,868,156 | 1/1959 | De Cola et al. | 116—137 |
| 2,920,604 | 1/1960 | McDonald | 116—137 |
| 2,923,918 | 2/1960 | Adler | 340—171 |
| 2,979,022 | 4/1961 | Adel | 116—137 |
| 3,017,849 | 1/1962 | Grossenheider | 116—137 |
| 3,022,493 | 2/1962 | Tschumi et al. | 340—171 |
| 3,028,832 | 4/1962 | Luzzery | 116—137 |
| 3,046,933 | 7/1962 | Kemeny | 116—137 |
| 3,048,144 | 8/1962 | Vistain | 116—137 |
| 3,077,856 | 2/1962 | Rieth | 116—137 |
| 3,094,972 | 6/1963 | Leavenworth | 116—137 |
| 3,157,152 | 11/1964 | Rieth | 116—137 |
| 3,144,851 | 8/1964 | Chearello | 116—137 |
| 3,164,127 | 1/1965 | Schmid | 116—137 |
| 2,992,412 | 7/1961 | Spindler | 340—171 |
| 3,133,269 | 5/1964 | Cotsworth | 340—171 |

FOREIGN PATENTS

| | | |
|---|---|---|
| 825,068 | 12/1951 | Germany. |

LOUIS J. CAPOZI, *Primary Examiner.*